United States Patent [19]

Baumann et al.

[11] Patent Number: 5,695,791
[45] Date of Patent: Dec. 9, 1997

[54] APPARATUS FOR PRODUCING FOAMED PLASTICS PARTS

[75] Inventors: Karl-Heinz Baumann, deceased, late of Battenberg, by Marianne Baumann, legal representative; Johann Nikolitsch, Schifferstadt; Manfred Genz, Damme, all of Germany

[73] Assignee: BASF Aktiengesellschaft, Ludwigshafen, Germany

[21] Appl. No.: 546,093

[22] Filed: Oct. 19, 1995

[30] Foreign Application Priority Data

Oct. 25, 1994 [DE] Germany .................. 44 38 143.3

[51] Int. Cl.$^6$ .................. B29C 45/40; B29C 45/66
[52] U.S. Cl. ............ 425/436 R; 425/4 R; 425/436 RM; 425/438; 425/442; 425/577
[58] Field of Search .............. 425/450.1, 451.3, 425/451.5, 592, 593, 595, 436 R, 4 R, 436 RM, 438, 577, 442; 249/67; 264/1.3

[56] References Cited

U.S. PATENT DOCUMENTS

| Re. 30,130 | 10/1979 | Edwards | 425/4 R |
|---|---|---|---|
| 292,434 | 1/1884 | Hubel | 425/438 |
| 296,895 | 4/1884 | Tucker | 425/438 |
| 3,128,505 | 4/1964 | Ludwig | 425/595 |
| 3,400,429 | 9/1968 | Ludwig | 425/4 R |
| 3,479,690 | 11/1969 | Hagen | 425/438 |
| 3,624,672 | 11/1971 | Spivy | 425/4 R |
| 3,674,408 | 7/1972 | Baumgartner et al. | 425/4 R |
| 3,732,051 | 5/1973 | Sakabe et al. | |
| 3,924,995 | 12/1975 | Crooks et al. | 425/592 |
| 3,983,922 | 10/1976 | Albenga | 425/438 |
| 4,008,990 | 2/1977 | Heimer et al. | |
| 4,080,145 | 3/1978 | Jung | 425/451.5 |
| 4,204,824 | 5/1980 | Paradis | 425/438 |
| 4,354,819 | 10/1982 | Wirz | 425/4 R |
| 4,828,769 | 5/1989 | Maus et al. | 264/1.3 |
| 5,295,802 | 3/1994 | Hersbt | 249/67 |
| 5,525,278 | 6/1996 | Krosch et al. | 425/4 R |

FOREIGN PATENT DOCUMENTS

| 221-872-A | 5/1987 | European Pat. Off. | 425/450.1 |
|---|---|---|---|
| 411-960-A | 2/1991 | European Pat. Off. | 425/450.1 |
| 20 42 779 | 8/1970 | Germany . | |
| 24 15 703 | 4/1974 | Germany . | |
| 35 20 581 | 12/1985 | Germany . | |
| 0160108 | 9/1983 | Japan | 425/442 |
| 395-275 | 1/1974 | U.S.S.R. | 425/450.1 |
| 1014731 | 4/1983 | U.S.S.R. | 425/438 |
| 1052396 | 11/1983 | U.S.S.R. | 425/438 |
| 1162606 | 6/1985 | U.S.S.R. | 425/438 |
| 1212827 | 2/1986 | U.S.S.R. | 425/438 |
| 1382-657-A | 3/1988 | U.S.S.R. | 425/450.1 |

*Primary Examiner*—Jay H. Woo
*Assistant Examiner*—Minh-Chau T. Pham
*Attorney, Agent, or Firm*—Keil & Weinkauf

[57] ABSTRACT

In an apparatus for producing foamed plastics parts, a closed mold (1) is filled with polymer molding compound and, after the elapse of a reaction time, the finished part is removed. A plurality of identical molds (1) run on mold carriers (5) through a production installation. For the purpose of reducing the production outlay, a demolding device (11) shared by all the molds (1) is brought into operative connection successively with the molds (1) and in each case one mold (1) is opened. The movements required in this operation are executed by the demolding device (11). An unlocking unit (19) and a swiveling unit (20) of the demolding device (11) are brought into engagement with the mold (1) by a positioning unit (21), after which the mold (1) is unlocked and one mold half (1a) of the mold (1) is swung open. For unlocking the mold (1), the latter is raised against spring force and a positive locking is brought out of engagement.

10 Claims, 3 Drawing Sheets

APPARATUS FOR PRODUCING FOAMED PLASTICS PARTS

BACKGROUND OF THE INVENTION

1. Field of the Invention

The invention relates to a process for producing foamed plastics parts, in which a closed mold is filled with polymer molding compound and, after the elapse of a reaction time, the finished part is removed, a plurality of identical molds running on mold carriers through a production installation. The invention also relates, however, to an apparatus suitable for this, namely one which has a plurality of identical closed molds which are in each case fastened on a mold carrier and are intended for running through a production installation.

2. Description of the Related Art

For plastics parts which are produced by foaming and consist, for example, of polyurethane, both open molds and closed molds are used. It is known from DE 35 20 581 C2 to equip a mold carrier receiving the mold with various drives for opening and closing the mold.

SUMMARY OF THE INVENTION

It is an object of the present invention to provide a process and an apparatus of the type mentioned at the beginning by which the outlay on production is reduced.

We have found that this object is achieved according to the invention with regard to the process for producing foamed plastics parts by a demolding device shared by all the molds being brought into operative connection successively with the molds and in each case one mold being opened, the movements required being executed by the demolding device.

The idea essential for the invention is consequently that all the molds are demolded by one demolding device and thus only one demolding device is used in a production installation. In contrast to the production process of the prior art, in which each mold has its own devices and drives for demolding on a "kinetic" mold carrier, which consequently both fixes and opens the mold, in the case of the process according to the invention the technical outlay is significantly less, since the mold is fastened on a purely "static" mold carrier, which, for opening the mold for the purpose of removing the finished part, is brought into operative connection with a shared demolding device.

The movements required for demolding are executed by the separate demolding device. The mold carrier serves exclusively for the fixing of the mold. By virtue of the reduced dimensions of the mold carriers, a considerably greater number of molds can run through the production installation.

According to an advantageous development of the invention, it is proposed that an unlocking unit and a swiveling unit of the demolding device are brought into engagement with the mold by a positioning unit, after which the mold is unlocked and one mold half of the mold is swung open. The mold, or the mold carrier, consequently does not need to be moved for the demolding operation from where it already is.

With a view to a simple sequence in the opening of the mold, it proves to be favorable if, for unlocking the mold, the latter is raised against spring force and a positive locking is brought out of engagement.

In the case of a process in which the plastics parts are respectively foamed around a core, the core is expediently tapered downward and the mold is filled from below. As a result, the foam rises in the filling flow direction, whereby uniform finished parts are produced. The greater density in the lower region of the mold, caused by gravity, occurs advantageously in the region of the smallest core diameter, that is to say where the wall thickness of the finished part is at its greatest.

Easy pulling off of the hollow finished part produced in this way is achieved by the core being swiveled out laterally from the mold by the swiveling unit and the finished part being pulled off laterally downward. In this case, the finished part can be removed from the mold without removal of the core.

The object mentioned at the beginning is achieved according to the invention with regard to the apparatus for producing foamed plastics parts by providing a demolding device which is shared by all the molds, can be brought into operative connection with in each case one mold and has means for opening the mold. In a development of the invention, the demolding device has an unlocking unit and a swiveling unit for swinging open one mold half of the mold and also a positioning unit, by which the unlocking unit and the swiveling unit can be brought into engagement with the mold and/or the mold half.

The mold is expediently acted upon by spring force loading toward a mold base, which is connected to the mold carrier, and the unlocking unit has a movement generator which is effective against the spring force and is preferably designed as a hydraulic or pneumatic cylinder.

A particularly simple construction of the apparatus according to the invention is obtained by a design in which the mold is positively locked of its own accord in the lowered position.

A possible way of bringing about the positive locking which is advantageous in production-engineering and functional terms is for there to be provided in the bottom of the mold carrier a conical groove which can be brought into engagement with the mold and the swingable mold half by lowering of the mold.

A simple and functionally reliable construction of the demolding device is obtained by the swiveling unit having a movement generator preferably designed as a hydraulic or pneumatic cylinder.

Likewise having a favorable effect is a development according to which the positioning unit has a linear guide, with a guide element and a movable guide carriage, on which the unlocking unit and the swiveling unit are fastened and which is longitudinally movable in relation to the guide element by a movement generator preferably designed as a hydraulic or pneumatic cylinder.

According to one design of the apparatus according to the invention, the unlocking unit can be easily brought into operative connection with the mold by the unlocking unit having a claw coupling which, by the moving of the guide carriage, can be brought into engagement with a clip fastened on the mold.

The demolding device expediently operates automatically, which is made possible in a simple way by the movement generators being connected to a programmable control unit.

For the reasons already described above, it is favorable if the mold has a core which is tapered downward and if the mold can be filled from below. Easy removal of the finished part is brought about in that the core can be swiveled out laterally from the mold by the swiveling unit.

The molds are advantageously mounted on a belt installation. Such a belt installation can receive significantly more molds than, for example, a mold carousel.

According to an expedient development, the belt installation includes a thermal treatment installation. The molds are sent through the thermal treatment installation. This was not possible in the case of the known production processes, owing to the demolding drives integrated in the mold carrier. Rather, in that case each mold had to be heated separately.

BRIEF DESCRIPTION OF THE DRAWING

Further advantages and details of the invention are explained in more detail with reference to the exemplary embodiment represented in the diagrammatic figures, in which.

DESCRIPTION OF THE PREFERRED EMBODIMENTS

Figure 1:
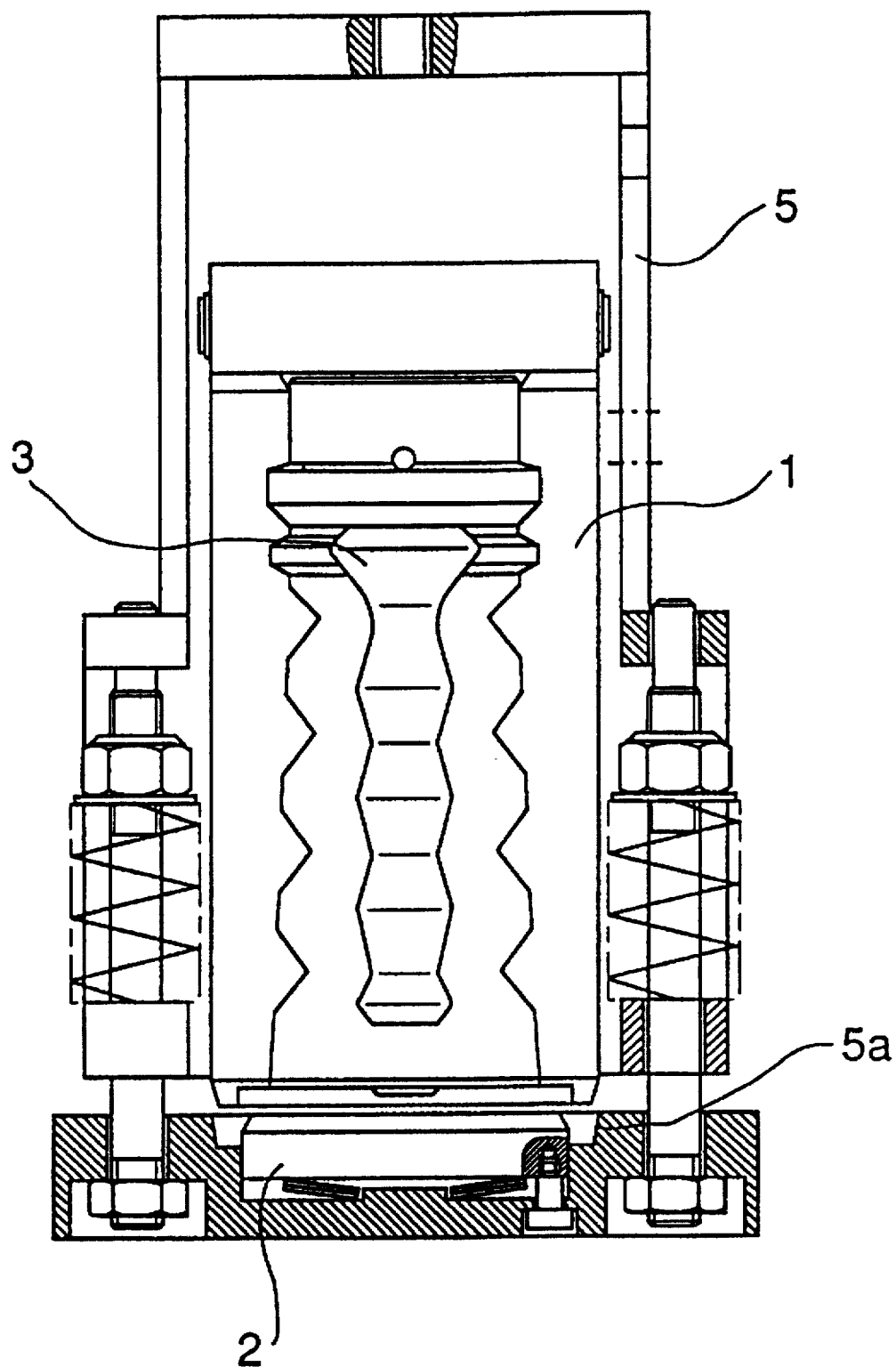
FIG. 1 shows a side view of an opened mold for producing a foamed plastics part.

In the representation of a mold 1 according to FIG. 1, a swing-open mold half has been removed and thus the mold 1 is shown in the opened state. The mold 1 is closed off underneath by a mold base 2, which can be removed for a demolding of the finished part. This takes place—as still to be explained in more detail—by the mold 1 being raised. Arranged in the interior of the mold 1 is a downwardly tapering core 3, with the result that the wall thickness of the hollow finished part to be produced in the mold increases downward in the figure. The mold 1 represented serves for the production of foamed polyurethane spring elements.

Figure 2:
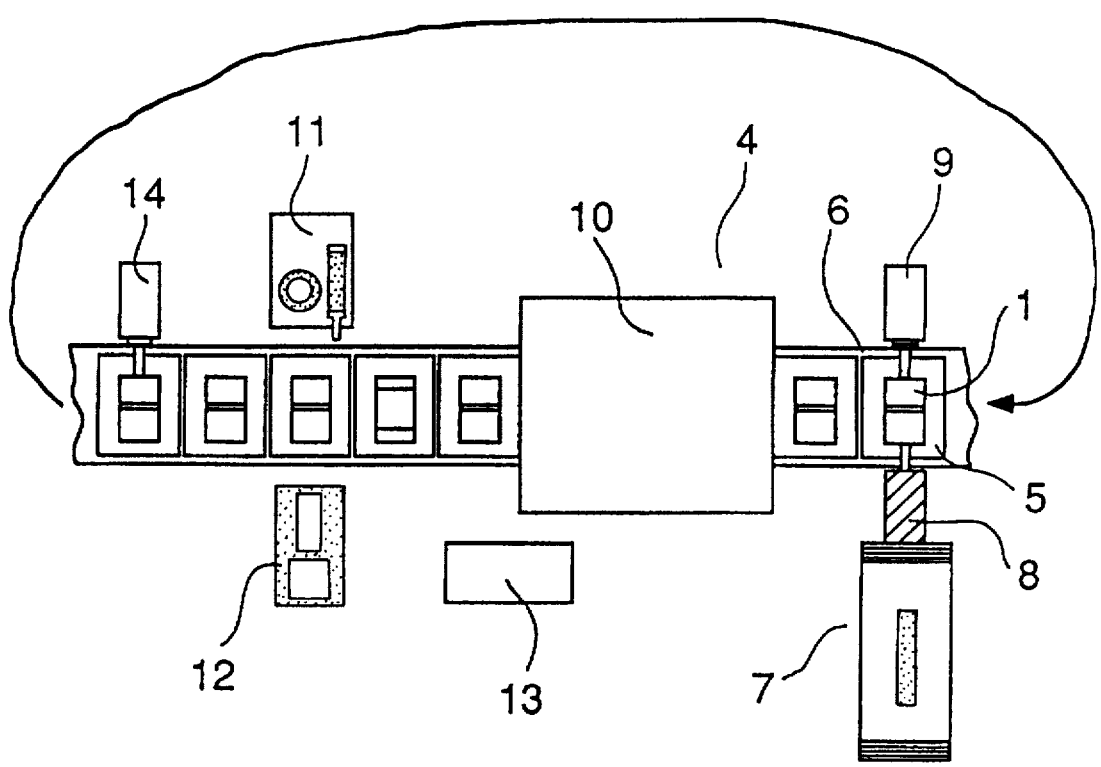
FIG. 2 shows a basic diagram of a production installation and FIG. 3 shows a basic diagram of a demolding device.

In the production installation diagrammatically represented in FIG. 2, a plurality of molds 1 are mounted in series on a belt installation 4. In this case, the molds 1 are fastened on mold carriers 5 and are sent by a conveyor belt 6 through the production installation.

The closed molds 1 successively reach first of all a reaction injection molding machine 7 and are filled there from below with polymer molding compound. This involves a high-pressure or low-pressure mixing head 8 moving up to the mold and filling it from below, or laterally from below. A holding device 9 provides the dimensional stability of the mold 1 required during filling. After filling, the mixing head 8 moves back and the holding device 9 releases the mold 1.

The mold 1 continues to be kept closed and passes through a thermal treatment installation 10. Subsequently, the mold 1 reaches a demolding point, at which a demolding device 11 shared by all the molds of the production installation is brought into engagement with the mold 1. This involves the mold 1 being opened, in a way still to be described, and the finished part being removed laterally downward by a handling device 12 and deposited on a rest element 13. Thereafter, the closed-again mold 1 reaches a release-agent device 14, whereupon a return to the reaction injection molding machine 7 and renewed filling take place.

Figure 3:
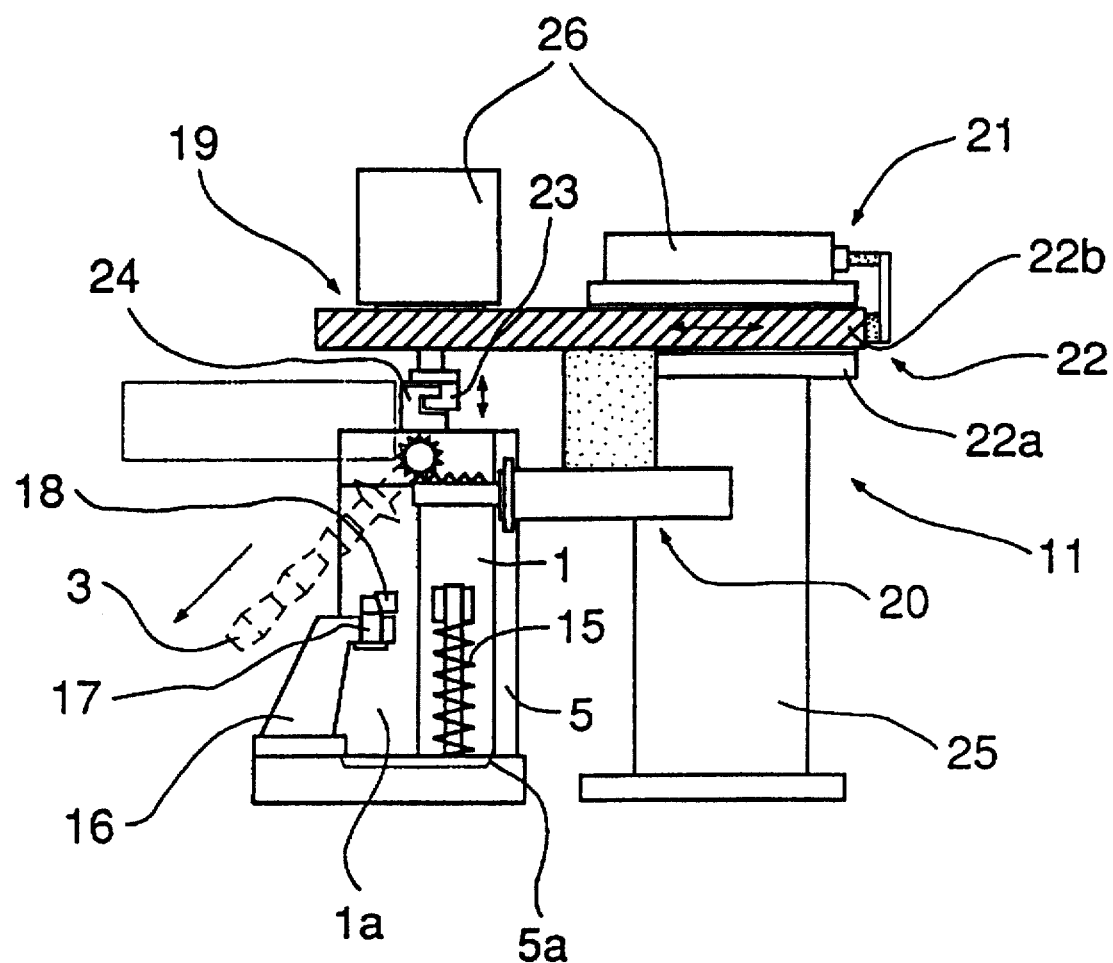

The demolding operation will be explained in more detail with reference to the illustration in FIG. 3:

The mold 1 is acted on downward in the vertical direction, i.e. in the direction of the mold base 2 (not shown in the Figure), which is fastened on the mold carrier 5, by means of one or more springs 15, designed as tension springs in the configuration represented. In the lowered state, the mold 1 and the swing-open mold half 1a are kept closed by the spring(s) 15 in interaction with a conical groove 5a in the bottom part of the mold carrier 5, the mold base at the same time coming into bearing contact and forming a metallic seal. Consequently, in the lowered position, the mold 1 is positively locked of its own accord.

Additionally provided in this exemplary embodiment is an adjustable locking pin 17, which is fastened on the mold carrier 5 and is in engagement with a wedge 18 of the swing-open mold half 1a. Support 16 carried adjustable locking pin 17.

There are preferably provided two such locking pins 17, on either side of the mold 1, i.e. in addition to the locking pin 17 represented in the Figure there is a further wedge 18 arranged behind the plane of the drawing.

The demolding device 11 has an unlocking unit 19 and a swiveling unit 20, which are both brought into engagement with the mold 1 by a positioning unit 21. The positioning unit 21 is provided with a linear guide 22, which comprises a guide element 22a and a movable guide carriage 22b. The unlocking unit 19 and the swiveling unit 20 are fastened on the guide carriage 22b of the linear guide 22. When the guide carriage 22b moves out from the rest position, a claw coupling 23, connected to the unlocking device 19, comes into engagement with a clip 24, which is connected to the mold 1. At the same time, the swiveling unit 20 comes into engagement with an opening mechanism of the mold 1a, which is diagrammatically represented in FIG. 3 by a rack-gear connection. The positioning unit 21 not only positions the unlocking unit 19 and the swiveling unit 20, but also transfers all the forces to a frame 25, which is anchored on the base or on the belt installation 4.

The mold 1 is raised from the mold base 2 against the locking force by the unlocking unit 19, the claw coupling 23 transferring the force. As a result, the positive connection is released of its own accord, since the mold 1 and the swingable mold half 1a are lifted out of the conical groove 5a and the locking pin 17. The mold half 1a is swung away by the swiveling unit 20 through about 90 degrees (represented by dot-dashed lines), the core 3 at the same time being swiveled out laterally from the mold 1. The finished part can then be pulled off laterally downward. Since the greatest core diameter is located at the upper end of the mold 1, the finished part can easily be demolded. Core removal is not required when removing the finished pan from the mold 1.

The demolding device 11 consequently has the three functions of positioning, lifting and swiveling and executes all the movements required for the opening of the mold 1, while the mold carrier 5, on which the mold is fastened, performs a purely static function.

Both the positioning unit 21 and the unlocking unit 19 as well as the swiveling unit 20 are equipped with movement generators 6, which are designed as hydraulic or pneumatic cylinders and are connected to a programmable control unit (not shown in the Figures), which is preferably also connected to the other components of the belt installation 4 in order to permit intermittent or continuous operation.

We claim:

1. An apparatus for producing foamed plastic parts, the apparatus comprising a plurality of identical molds which are in each case fastened on a mold carrier and run through a production installation, the apparatus further comprising a demolding device which is shared by all the molds and is in successive operative connection with each mold and has means for opening each mold, each mold having a core which is tapered downward, a swing-open mold half which is locked in the closed state, and a vertically located parting plane, the demolding device also having a positioning unit, by which the unlocking unit and the swiveling unit are brought into engagement with either the mold or the mold half, the core being swiveled laterally from the mold by the swiveling unit with each mold adapted to be filled from below in the closed state.

2. The apparatus of claim 1, further comprising a mold base which is fastened to the mold carrier by means of one or more springs thereby generated a force which loads toward the base, and said unlocking unit has a movement generator which is effective against the spring force.

3. The apparatus of claim 1, further comprising one or more locking pins which are fastened to the mold carrier and engage a wedge of the swing open mold half of the mold.

4. The apparatus of claim 3, wherein the positive locking is effected by providing in the mold carrier (5) a conical groove (5a) and a locking pin (17), which are brought into engagement with the mold (1) and the swingable mold half (1a) by a lowering of the mold (1).

5. The apparatus of claim 2, wherein the movement generator (26) is a hydraulic or pneumatic cylinder.

6. The apparatus of claim 2, wherein the positioning unit (21) has a linear guide (22), with a guide element (22a) and a movable guide carriage (22b), in which the unlocking unit (19) and the swiveling unit (20) are fastened, and which is longitudinally movable in relation to the guide element (22a) by movement generator (26).

7. The apparatus of claim 6, said mold further having a clip, and said unlocking unit having a claw coupling connected to the uncoupling unit, said claw coupling being engageable with said clip.

8. The apparatus of claim 2, wherein the movement generator (26) is connected to a programmable control unit.

9. The apparatus of claim 1, wherein each mold (1) is mounted on a belt installation (4).

10. The apparatus of claim 9, wherein the belt installation (4) includes a thermal treatment installation (10) located between a filling station and the demolding device (11).

* * * * *